United States Patent
Behling

(10) Patent No.: US 9,802,352 B2
(45) Date of Patent: Oct. 31, 2017

(54) EXTRUDER SCREW, EXTRUDER, AND METHOD FOR PRODUCING AN EXTRUDER SCREW

(75) Inventor: Michael Behling, Hameln (DE)

(73) Assignee: KraussMaffei Berstorff GmbH, Hannover (DE)

( * ) Notice: Subject to any disclaimer, the term of this patent is extended or adjusted under 35 U.S.C. 154(b) by 520 days.

(21) Appl. No.: 14/241,028

(22) PCT Filed: Aug. 31, 2012

(86) PCT No.: PCT/EP2012/066937
§ 371 (c)(1),
(2), (4) Date: Feb. 25, 2014

(87) PCT Pub. No.: WO2013/030322
PCT Pub. Date: Mar. 7, 2013

(65) Prior Publication Data
US 2014/0199424 A1    Jul. 17, 2014

(30) Foreign Application Priority Data
Sep. 1, 2011  (DE) .......................... 10 2011 112 148

(51) Int. Cl.
*B29C 47/60* (2006.01)
*B29C 47/08* (2006.01)
(Continued)

(52) U.S. Cl.
CPC ...... *B29C 47/0844* (2013.01); *B29C 47/0803* (2013.01); *B29C 47/0825* (2013.01);
(Continued)

(58) Field of Classification Search
CPC . B29C 47/0844; B29C 47/0803; B29C 47/38; B29C 47/60; B29C 47/0825;
(Continued)

(56) References Cited

U.S. PATENT DOCUMENTS 2,038,554 A * 4/1936 Edgar .................... F16D 1/092
                                                      403/359.5
2,297,390 A * 9/1942 Burger .................... F16D 1/06
                                                      403/350
(Continued)

FOREIGN PATENT DOCUMENTS

DE    43 24 271 A1    12/1994
DE    44 21 514       12/1995
(Continued)

OTHER PUBLICATIONS

International Search Report issued by the European Patent Office in International Application PCT/EP2012/066937 dated Jan. 24, 2013.

*Primary Examiner* — Charles Cooley
(74) *Attorney, Agent, or Firm* — Henry M. Feiereisen LLC

(57) ABSTRACT

An extruder screw includes an extruder shaft and at least one extruder segment. The extruder shaft has a prismatic mandrel having external teeth and a longitudinal mandrel axis. The extruder segment has internal teeth and a longitudinal internal-teeth axis and can be slid onto the mandrel, such that the extruder segment can be connected to the mandrel for rotation therewith. The internal teeth have a profile having a meshing profile and, in an inner area between the first and second end faces of the extruder segment, include a prismatic main profile that has a main cross-section. Furthermore, the internal teeth of the extruder segment have an edge profile adjacent to at least one end face of the extruder segment, which edge profile has a smaller edge cross-section than the main profile at least in the area of the meshing profile.

11 Claims, 5 Drawing Sheets

(51) Int. Cl.
*F16D 1/10* (2006.01)
*B29C 47/38* (2006.01)
*B29C 47/62* (2006.01)
*B29C 47/00* (2006.01)

(52) U.S. Cl.
CPC .............. *B29C 47/38* (2013.01); *B29C 47/60* (2013.01); *B29C 47/6056* (2013.01); *B29C 47/622* (2013.01); *F16D 1/101* (2013.01); *B29C 47/0009* (2013.01); *F16D 2001/103* (2013.01); *Y10T 29/49242* (2015.01)

(58) Field of Classification Search
CPC ............... F16D 2001/103; F16D 1/101; Y10T 403/7026; Y10T 403/7035; Y10T 29/49252
USPC ...................... 403/359.1, 359.6; 29/888.023
See application file for complete search history.

(56) References Cited

U.S. PATENT DOCUMENTS

| | | | | |
|---|---|---|---|---|
| 3,290,918 | A * | 12/1966 | Weasler | F16D 1/10 29/893.2 |
| 4,115,022 | A * | 9/1978 | Orain | F16D 3/06 192/108 |
| 5,797,677 | A * | 8/1998 | Weihrich | B01F 7/001 366/331 |
| 6,604,885 | B1 * | 8/2003 | Neuner | F16D 1/06 29/889.22 |
| 9,573,313 | B2 * | 2/2017 | Benjamin | B29C 47/40 |
| 2006/0291324 | A1 * | 12/2006 | Kodate | B29C 47/60 366/79 |
| 2009/0274003 | A1 | 11/2009 | Blach | |
| 2010/0303537 | A1 | 12/2010 | Brown et al. | |
| 2011/0182659 | A1 | 7/2011 | Padmanabhan | |
| 2014/0199424 | A1 * | 7/2014 | Behling | B29C 47/0825 425/204 |
| 2016/0325467 | A1 * | 11/2016 | Szurgot | B29B 7/429 |

FOREIGN PATENT DOCUMENTS

| | | | |
|---|---|---|---|
| DE | 10 2004 042 746 A1 | 3/2006 | |
| DE | 10 2006 029 471 A1 | 12/2006 | |
| DE | 10 2005 053 907 A1 | 5/2007 | |
| FR | 2918726 A1 * | 1/2009 | ............ F01D 5/026 |
| JP | 2004-044660 | 2/2004 | |
| WO | WO 2010/038235 A1 | 4/2010 | |
| WO | 2015/085340 A2 * | 6/2015 | |

* cited by examiner

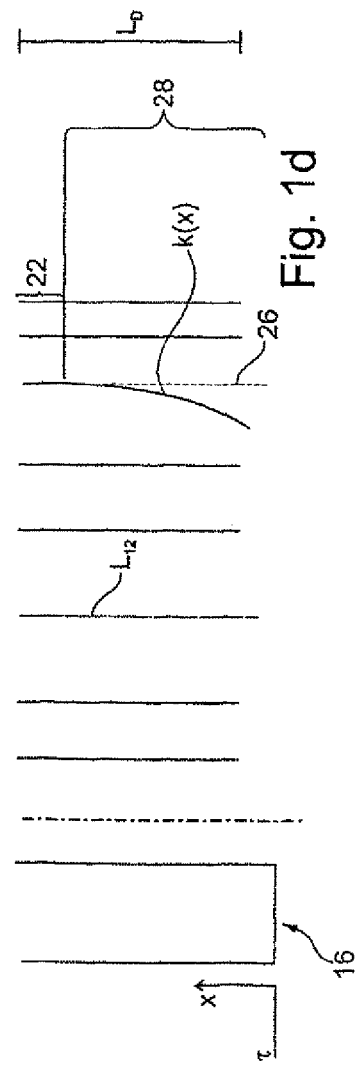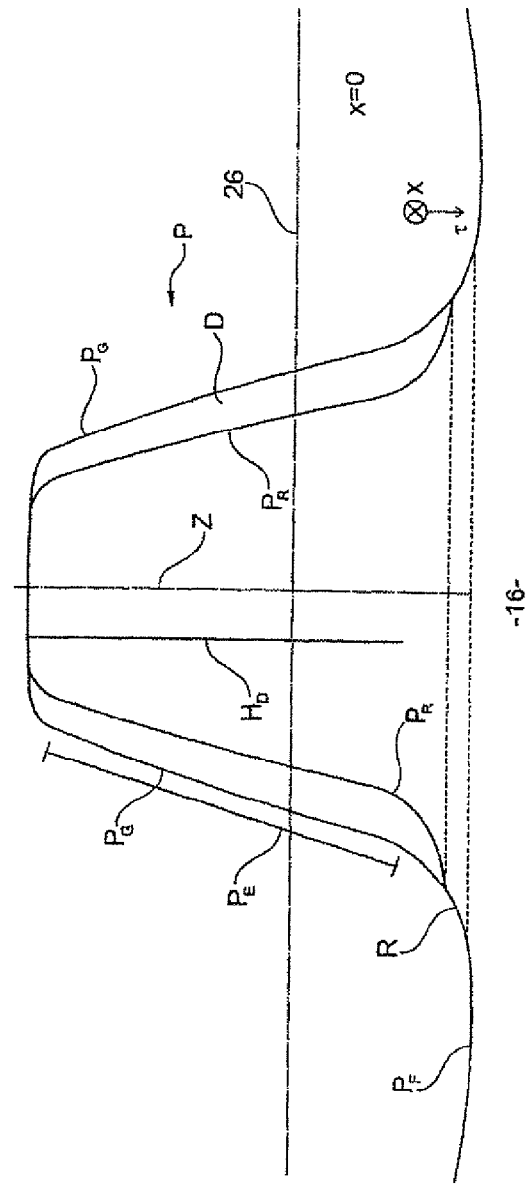

EXTRUDER SCREW, EXTRUDER, AND METHOD FOR PRODUCING AN EXTRUDER SCREW

CROSS-REFERENCES TO RELATED APPLICATIONS

This application is the U.S. National Stage of International Application No. PCT/EP2012/066937, filed Aug. 31, 2012, which designated the United States and has been published as International Publication No. WO 2013/030322 and which claims the priority of German Patent Application, Serial No. 10 2011 112 148.3, filed Sep. 1, 2011, pursuant to 35 U.S.C. 119(a)-(d).

BACKGROUND OF THE INVENTION

The invention relates to an extruder screw comprising an extruder shaft and at least one extruder segment. The extruder shaft comprises a prismatic mandrel having external teeth and a longitudinal mandrel axis. The extruder segment has internal teeth and a longitudinal internal-teeth axis and can be slid onto the mandrel, such that the extruder segment can be connected to the mandrel for rotation therewith. The internal teeth have a profile having a meshing profile and, in an inner area between the first and second end faces of the extruder segment, comprise a prismatic main profile that has a main cross-section.

According to a second aspect, the invention relates to an extruder, in particular a double screw extruder, with an extruder screw according to the invention disposed within a barrel as is conventional in the extruder art.

According to a third aspect, the invention relates to a method for producing an extruder screw or an extruder according to the invention.

Extruders generally have a mandrel with external teeth, on which extruder segments are arranged for rotation therewith. This makes it possible to replace or change the extruder segments, in so far as this is necessary. The desire exists to operate extruders with as high a torque as possible, so that high throughput rates are able to be achieved. However, limits are set on the increase of the torque, because the destruction of the extruder segment occurs above a critical torque.

SUMMARY OF THE INVENTION

The invention is based on the problem of increasing the torque with the same mandrel, i.e. to provide an extruder screw or an extruder with increased torque absorption.

The invention solves the problem by a generic extruder screw in which the internal teeth of the extruder segment have an edge profile adjacent to at least one end face of the extruder segment, which edge profile has a smaller edge cross-section than the main profile at least in the area of the meshing profile, wherein the longitudinal internal-teeth axis runs coaxially to the mandrel longitudinal axis and the internal teeth mesh with the external teeth, so that the extruder segment is connected to the mandrel for rotation therewith.

According to a second aspect, the invention solves the problem by a generic extruder with at least one extruder screw according to the invention.

According to a third aspect, the invention solves the problem by a method for producing an extruder screw according to the invention with the steps of (a) producing a prismatic mandrel with external teeth by hammering with a hammer tool, (b) producing a pre-extruder segment, which has prismatic internal teeth, (c) producing an eroding tool with the hammer tool and (d) producing the profile deviation or respectively profile correction of the internal teeth by sink erosion with the eroding tool.

An advantage in the invention is that the extruder screw can be acted upon with a higher torque before damage occurs.

A further advantage is that the invention is able to be implemented with little effort. Thus, it is merely necessary to process the extruder segments at their edge, whilst the remaining design of the extruder does not have to be altered.

The invention is based on the idea of using a conventional, prismatic mandrel with external teeth and to configure one or more extruder segments, to be slid onto the mandrel, and having inner teeth, such that they are indeed connected to the mandrel for rotation therewith, but in the region at least of one end face of the extruder segment an approximately wedge-shaped intermediate space is produced between the flanks of the internal and external teeth, i.e. on the side of the teeth. These intermediate spaces are, however, only so long that a connection of mandrel and extruder segments for co-rotation is possible. The flanks of the internal teeth of the extruder segments advantageously have a curvature in the region of the intermediate spaces, in order to obtain a soft contour of the internal teeth. The invention is based here on the knowledge that it is advantageous to weaken the internal teeth locally, so that as a whole a higher wear resistance is produced. This knowledge was obtained by means of wear patterns of extruder segments. It has namely been found that with a purely prismatic profile both of the mandrel and also of the extruder segments, load peaks occur directly on the end face of the extruder segments, which lead to micro-notches, from which a crack can originate.

Within the present description, the feature that the edge profile has a smaller edge cross-section than the main profile is understood to mean that the projection of the edge cross-section along the mandrel longitudinal axis onto a plane perpendicular to the mandrel longitudinal axis is smaller than the edge profile at least in the area of the meshing profile. It is possible that areas of the main profile exist which extend over this projection; it is significant that the edge profile has a smaller edge cross-section in the area of the meshing profile. The meshing profile is the part of the profile via which a load, acting in circumferential direction, is transferred.

The profile is understood to mean the two-dimensional surface of the internal teeth in the respective area. The main profile is the part of the profile in the inner area. The edge profile is the part of the profile adjacent to the end face. The respective cross-section, i.e. the main cross-section or the edge cross-section, is understood to mean the cross-section through the internal teeth perpendicular to the longitudinal internal-teeth axis of the internal teeth in the area of the respective profile.

According to a preferred embodiment, the internal teeth have a longitudinal teeth axis, wherein the profile intersects an imaginary cylinder surface, the longitudinal axis of which runs coaxially to the longitudinal internal-teeth axis of the internal teeth and at half the tooth height, in a meshing profile longitudinal course, wherein the meshing profile longitudinal course is smooth in the mathematical sense. This is to be understood to mean that the meshing profile longitudinal course is always constantly differentiable. This information refers to a cylinder coordinate system, the axis of which runs along the longitudinal teeth axis.

The meshing profile longitudinal course runs rectilinearly in the inner area, i.e. it is a straight line, because the main profile is prismatic. Adjacent to the at least one end face, the meshing profile longitudinal course runs in a curved manner, wherein in particular a radius of curvature becomes greater with increasing distance from the end face. It is advantageous here that the risk of an increased notching effect is minimized.

Preferably, the profile is mirror-symmetrical with respect to a plane of symmetry which stands perpendicularly on the longitudinal internal-teeth axis and preferably runs halfway between the end face and a second end face.

Preferably, the internal teeth have a profile correction which describes the deviation of the edge cross-section from the main cross-section and thereby as a function of an edge distance from the nearest end face, wherein the profile correction extends up to an edge distance from the nearest end face of at least 2 mm, in particular at least 5 mm.

The profile correction is thereby formed with a given edge distance by the amount which is formed by the projection of the main cross-section along the longitudinal axis of the mandrel onto the plane which stands perpendicularly on the mandrel, reduced by the edge cross-section. The profile correction is thereby, for each distance from the nearest end face, an area dependent on the edge distance.

The surface area of the profile correction preferably decreases with an increasing distance from the nearest end face, in particular in a strictly monotonic manner. In this way, the extruder segment can nestle against the external teeth over a relative wide area in the case of load, so that a particularly good transmission of force is produced, which reduces the likelihood of wear.

Preferably, the profile correction extends over a profile correction length which is at the most one third of the extruder segment width. It has been found that a greater profile correction length is counterproductive.

Preferably, the profile correction has a profile correction height which is smaller than a tooth height of the internal teeth minus a base rounding radius. This ensures that no undesired small notch radii are introduced through the introduction of the profile correction.

Preferably, the internal teeth are involute teeth. It has been found that such teeth lead to a particularly small likelihood of failure. For the method for producing the extruder segment, it has proved to be particularly advantageous if the profile deviation is introduced by sink erosion. Hereby, a particularly high dimensional accuracy can be achieved, which in turn reduces the likelihood of a failure of the extruder segment.

It is particularly favorable if the sink erosion is carried out by an eroding tool which is produced with the same hammer tool as the mandrel of the extruder. This ensures that the profile deviation is identical for each tooth of the internal teeth, so that the load is distributed particularly uniformly.

BRIEF DESCRIPTION OF THE DRAWING

The invention is explained in further detail below with the aid of the enclosed drawings. There are shown FIG. 1a a perspective view, true to scale, of an extruder segment according to the invention, FIG. 1b an enlarged detail according to FIG. 1a, FIG. 1c a front view of a tooth of the internal teeth at the height of the end face, FIG. 1d a top view onto the tooth according to FIG. 1c, FIG. 1e a perspective view of an extruder in the form of a double screw extruder, FIG. 2a a cross-section through a mandrel of an extruder shaft of an extruder according to the invention and FIG. 2b a portion side view of the mandrel according to FIG. 2a.

DETAILED DESCRIPTION OF PREFERRED EMBODIMENTS

Figure 1A:
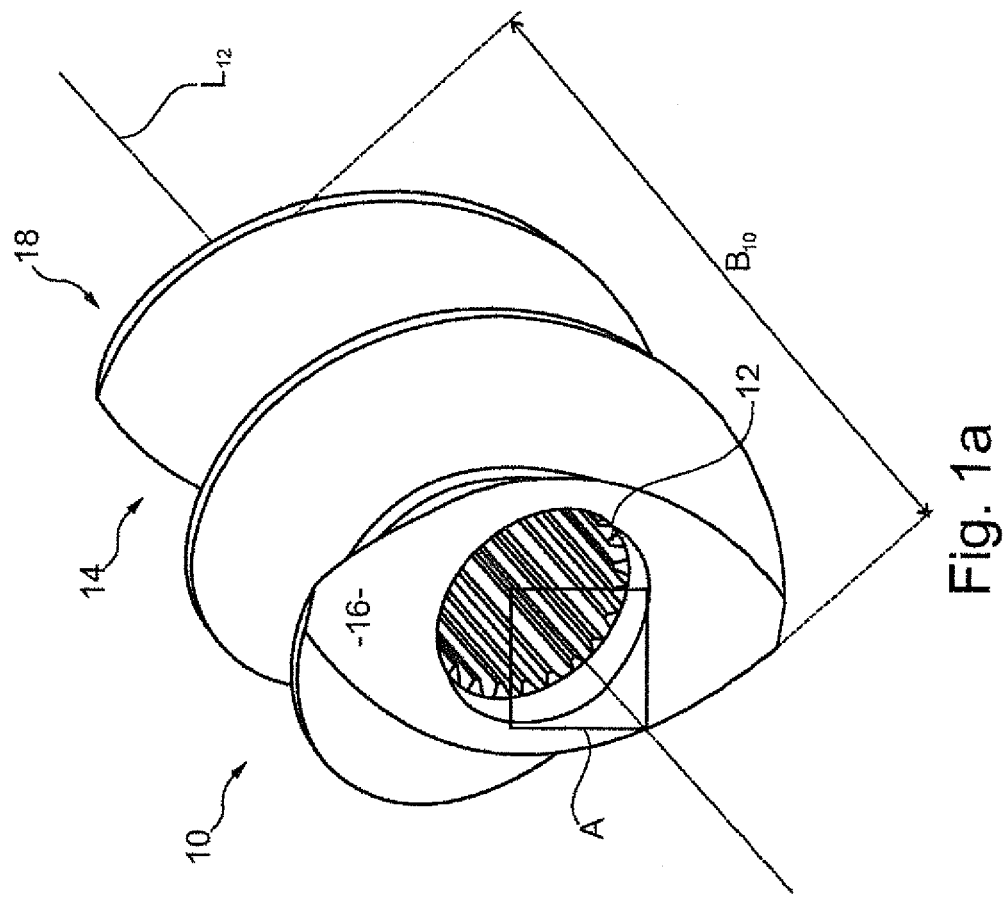

FIG. 1 shows an extruder segment 10 according to the invention, which has internal teeth 12, by means of which it is able to be slid onto complementary external teeth of a mandrel of an extruder shaft for rotation therewith. The internal teeth 12 have a meshing profile P, which is shown in FIG. 1c. FIG. 1a shows that the extruder segment 10 comprises an external screw 14. Alternatively, the extruder segment 10 can have for example a conveying, kneading or mixing structure.

The extruder segment 10 has a first end face 16 and a second end face 18 lying opposite the first end face 16, which second end face runs parallel to the first end face 16. The internal teeth 12 have a longitudinal teeth axis $L_{12}$, along which the extruder segment 10 has a segment width $B_{10}$.

Figure 1B:
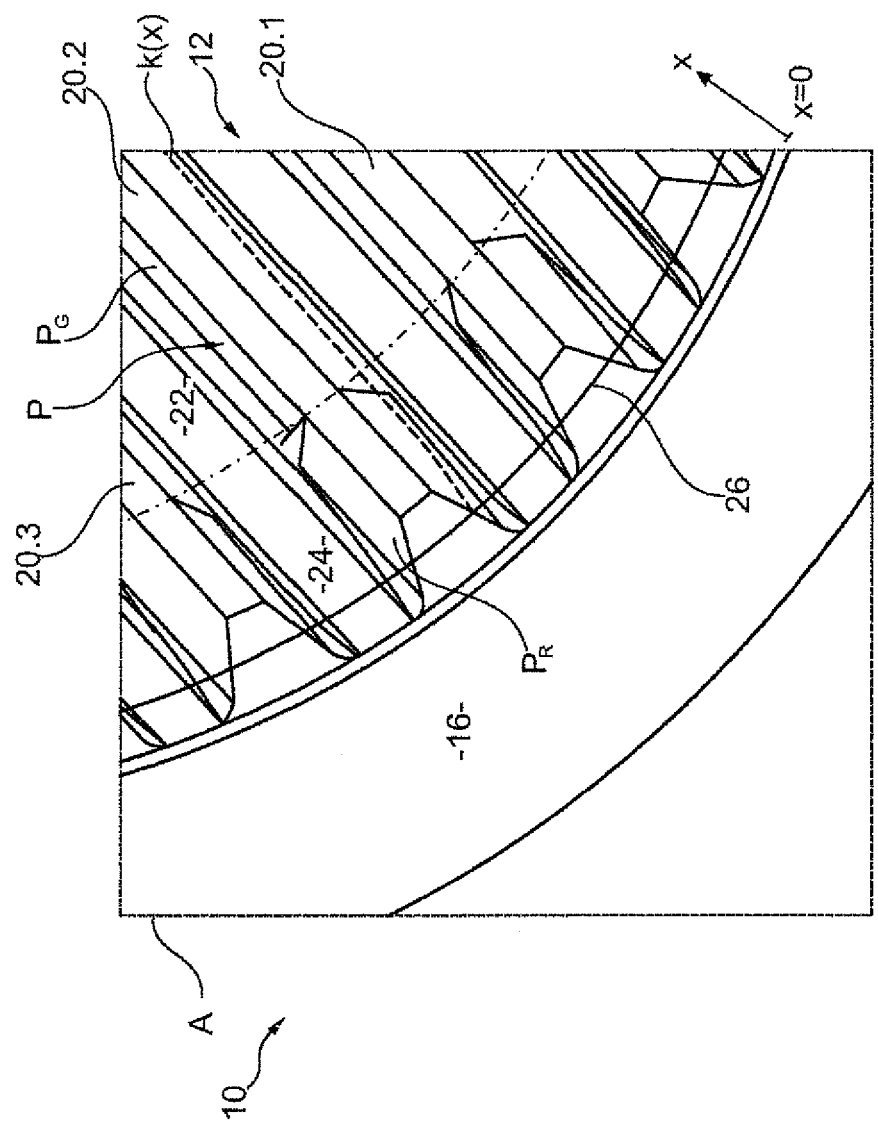

FIG. 1b shows the detail A according to FIG. 1a. It can be seen that the internal teeth 12 have a plurality of teeth 20.1, 20.2, . . . , which respectively have the same contour. The internal teeth 12 have an inner area 22 to which an end-face area 24 adjoins. The boundary between inner area 22 and end-face area 24 is marked by a dot-and-dash line.

In the inner area 22, the internal teeth 12 have a prismatic main profile $P_G$, the main cross-section of which is shown in FIG. 1c. FIG. 1b shows in addition that the internal teeth 12 have in the end-face area 24 an edge profile $P_R$, the edge cross-section of which is also shown in FIG. 1c. The profile P is understood to mean the two-dimensional surface of the internal teeth in the respective area. The main profile is the part of the profile P in the inner area 22, the edge profile $P_R$ is the part of the profile P in the end-face area 24, which could also be named the edge area.

The respective cross-section, i.e. the main cross-section or respectively the edge cross-section, is understood to mean the cross-section through the internal teeth 12 perpendicularly to the longitudinal internal-teeth axis $L_{12}$ (cf. FIG. 1a) of the internal teeth 12 in the area of the respective profile.

Adjacent to the end face 16, the internal teeth 12 have the edge profile $P_R$ with the edge cross-section, which is smaller than the main cross-section. In FIG. 1b this is to be seen in that the internal teeth 12 adjacent to the end face 16 taper towards the end face. When the extruder segment 10 is placed onto the prismatic mandrel of the extruder shaft, a small gap occurs adjacent to the end face 16, in which gap the internal teeth 12 do not lie with their full surface against the external teeth of the mandrel.

FIG. 1c shows a front view of a tooth, for example tooth 20.1, at the height of the end face 16. This corresponds to a projection of the profile along the mandrel longitudinal axis onto a plane, namely the plane of the drawing, which runs perpendicularly to the mandrel longitudinal axis. The main profile $P_G$ and the edge profile $P_R$ can be seen in the form of the main cross-section and of the edge cross-section. The edge cross-section is smaller than the main cross-section.

FIG. 1b shows in addition an imaginary cylinder surface 26, which is drawn as a dot-and-dash line in FIG. 1c and runs at half the tooth height Z. This imaginary cylinder surface 26 intersects the profile P in a meshing profile longitudinal course k(x), which is drawn in FIG. 1d. FIG. 1d is a top view onto the tooth according to FIG. 1c, FIG. 1*d* shows the view from above onto the profile, which is applied against x as longitudinal coordinate along the longitudinal internal-teeth axis $L_{12}$. x=0 applies for the point in which the longitudinal internal-teeth axis $L_{12}$ intersects the plane in which the end face 16 lies. It can be seen that the meshing profile longitudinal course k(x) is a straight line in the inner area 22, and runs in a curved manner in an edge area 28. The meshing profile longitudinal course k(x) is smooth, i.e. constantly differentiable. This applies in particular at the boundary between edge area 28 and inner area 22.

The edge profile $P_R$ is dependent on the distance x from the end face 16. FIG. 1*c* shows the situation for x=0, i.e. directly at the first end face 16. The profile correction D can be seen, which designates the area between the main cross-section and the edge cross-section. The description of the profile correction D as the area between the projection of the main profile onto a plane perpendicular to the longitudinal internal-teeth axis $L_{12}$ in the edge distance x and the intersection of the edge profile with this plane is equivalent.

The profile correction D is therefore dependent on the edge distance x. The profile correction D extends from the end face 16 up to an edge distance x, which is designated as profile correction length $L_D$. The profile correction length $L_D$ is drawn in FIG. 1*d*. It amounts to at the most one third of the extruder segment width $B_{10}$, which is drawn in FIG. 1*a*.

The profile correction D has in addition a profile correction height $H_D$, which designates the extent along the radial axis r, at the height of which the profile correction D is present. The profile correction height $H_D$ is preferably smaller than the tooth height Z minus a base rounding radius R, with which the meshing profile $P_E$ of the main profile $P_G$ continues into a base area $P_F$.

Figure 1E:
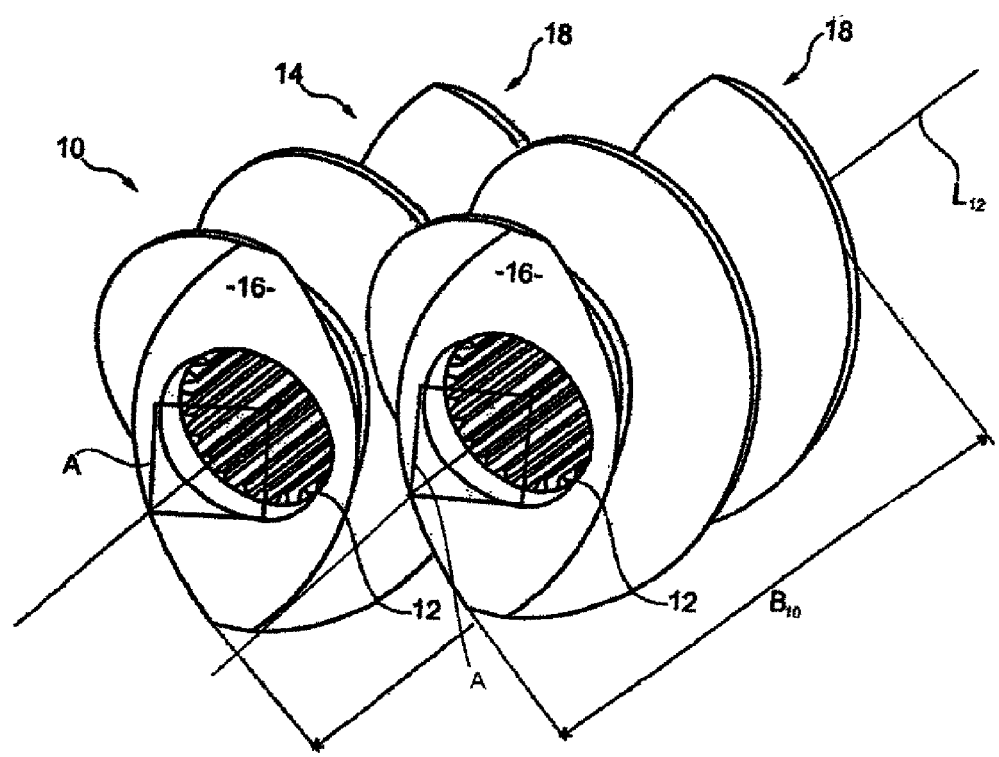

FIG. 1*e* shows a perspective view of an extruder in the form of a double screw extruder.

Figure 2A:
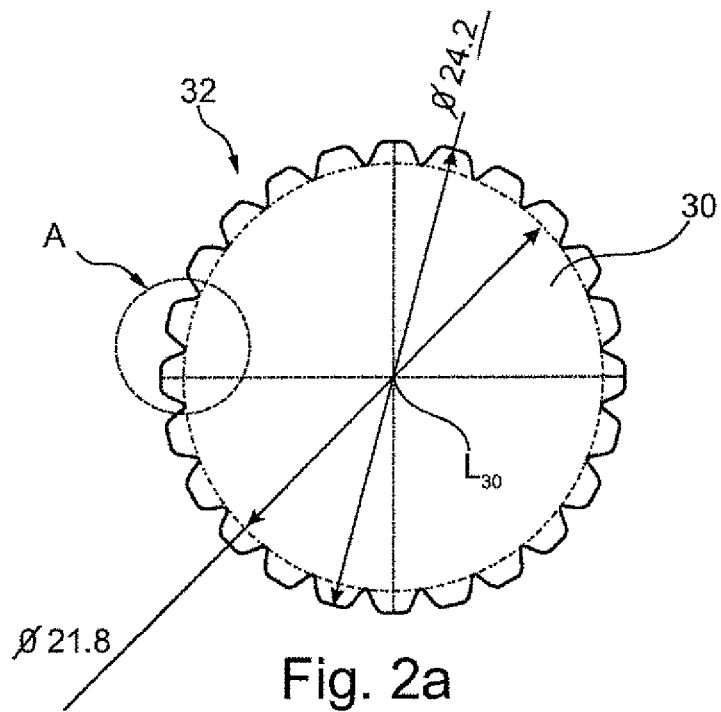

FIG. 2*a* shows a cross-section through a mandrel 30 of an extruder shaft of an extruder according to the invention. The mandrel 30 comprises external teeth 32, which are constructed in a complementary manner to the internal teeth 12. The mandrel 30 has a mandrel longitudinal axis $L_{30}$, which coincides with the longitudinal internal-teeth axis $L_{12}$ (cf. FIG. 1*a*).

Figure 2B:
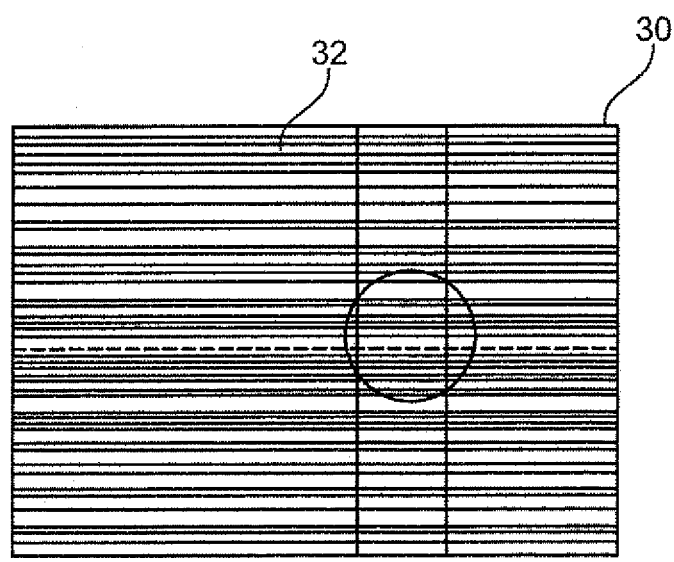

FIG. 2*b* shows the mandrel 30 in a portion in a longitudinal view, in which the external teeth 32 can be seen.

An extruder segment 10 according to the invention is produced in particular in that firstly a pre-extruder segment is produced with prismatic internal teeth. Subsequently, the profile correction D is produced by sink erosion. For the erosion treatment preferably an eroding tool is used, which was also used for the production of the external teeth 32 of the mandrel 30.

What is claimed is:

1. An extruder screw, comprising:
an extruder shaft having a prismatic mandrel provided with external teeth and defined by a mandrel longitudinal axis; and
at least one extruder segment comprising an external screw, the at least one extruder segment configured for placement onto the mandrel, said extruder segment defined by a longitudinal internal-teeth axis in coaxial relationship to the mandrel longitudinal axis and having internal teeth in mesh with the external teeth of the mandrel so that the extruder segment is connected in fixed rotative engagement with the mandrel, said internal teeth having a profile which has a meshing profile and a prismatic main profile with a main cross-section in an inner area between a first end face and a second end face of the extruder segment, said internal teeth have an edge profile adjacent to at least one of the first and second end faces, said edge profile having an edge cross-section which is smaller than the main profile at least in an area of the meshing profile, wherein the internal teeth have a profile correction which describes a deviation of the edge cross-section from the main cross-section as a function of an edge distance from a nearest one of the first and second end faces, said profile correction extending up to the edge distance from the nearest one of the first and second end faces of at least 2 millimeters, wherein the profile correction has a profile correction height which is smaller than a tooth height of the internal teeth minus a base rounding radius.

2. The extruder screw of claim 1, wherein the profile intersects in a meshing profile longitudinal course an imaginary cylinder surface having a longitudinal axis extending in coaxial relationship to the longitudinal internal-teeth axis of the internal teeth at half a tooth height, said meshing profile longitudinal course being smooth.

3. The extruder screw of claim 1, wherein the profile correction extends over a profile correction length which amounts to at most one third of a width of the extruder segment.

4. The extruder screw of claim 1, wherein the internal teeth are involute teeth.

5. The extruder screw of claim 1, wherein the second end face lies opposite the first end face, said profile being mirror-symmetrical with respect to a plane of symmetry which runs perpendicularly to the longitudinal internal-teeth axis and centrally between the first end face and the second end face.

6. An extruder, comprising a barrel and at least one extruder screw within the barrel which extruder screw includes an extruder shaft having a prismatic mandrel provided with external teeth and defined by a mandrel longitudinal axis, and at least one extruder segment comprising an external screw, the at least one extruder segment configured for placement onto the mandrel, said extruder segment defined by a longitudinal internal-teeth axis in coaxial relationship to the mandrel longitudinal axis and having internal teeth in mesh with the external teeth of the mandrel so that the extruder segment is connected in fixed rotative engagement with the mandrel, said internal teeth having a profile which has a meshing profile and a prismatic main profile with a main cross-section in an inner area between a first end face and a second end face of the extruder segment, said internal teeth have an edge profile adjacent to at least one of the first and second end faces, said edge profile having an edge cross-section which is smaller than the main profile at least in an area of the meshing profile, wherein the internal teeth have a profile correction, which describes a deviation of the edge cross-section from the main cross-section as a function of an edge distance from a nearest one of the first and second end faces, said profile correction extending up to the edge distance from the nearest one of the first and second end faces of at least 2 millimeters, wherein the profile correction has a profile correction height which is smaller than a tooth height of the internal teeth minus a base rounding radius.

7. The extruder of claim 6, constructed in the form of a double screw extruder.

8. The extruder of claim 6, wherein the profile correction extends over a profile correction length which amounts to at most one third of a width of the extruder segment.

9. The extruder of claim 6, wherein the internal teeth are involute teeth.

10. The extruder of claim 6, wherein the second end face lies opposite the first end face, said profile being mirror-symmetrical with respect to a plane of symmetry which runs perpendicularly to the longitudinal internal-teeth axis and centrally between the first end face and the second end face.

11. A method, comprising:
- producing a prismatic mandrel with external teeth by hammering with a hammer tool;
- producing a pre-extruder segment with prismatic internal teeth;
- producing an eroding tool with the hammer tool;
- producing a profile correction of the internal teeth by sink erosion with the eroding tool, and
- connecting the pre-extruder segment with the prismatic mandrel for rotation with the prismatic mandrel.

\* \* \* \* \*